US005612584A

United States Patent [19]

York et al.

[11] Patent Number: 5,612,584

[45] Date of Patent: Mar. 18, 1997

[54] SLIP RING ASSEMBLY WITH REINFORCEMENT RING

[75] Inventors: Michael T. York, Whitmore Lake; Richard K. Harris, Walled Lake, both of Mich.

[73] Assignee: Ford Motor Company, Dearborn, Mich.

[21] Appl. No.: 440,600

[22] Filed: May 15, 1995

[51] Int. Cl.[6] .............................. H01R 39/08; H02K 5/00

[52] U.S. Cl. .......................... 310/232; 310/68 D; 310/43; 310/235

[58] Field of Search ................................ 310/232, 68 D, 310/43

[56] References Cited

U.S. PATENT DOCUMENTS

| | | | |
|---|---|---|---|
| 3,185,878 | 5/1965 | Reisnecker | 310/232 |
| 4,105,907 | 8/1979 | Hagenlocher et al. | 310/232 |
| 4,346,321 | 8/1982 | Frister | 310/232 |
| 4,535,264 | 8/1985 | Allport | 310/232 |
| 4,645,962 | 2/1987 | Freeman | 310/232 |
| 4,684,179 | 8/1987 | Freeman | 439/27 |
| 4,705,976 | 11/1987 | Cacioppo et al. | 310/232 |
| 4,730,135 | 3/1988 | Dolderer et al. | 310/68 D |
| 4,871,935 | 10/1989 | Sweet et al. | 310/232 |
| 5,327,037 | 7/1994 | Rasmussen | 310/232 |

FOREIGN PATENT DOCUMENTS

| | | |
|---|---|---|
| 2091497 | 7/1982 | United Kingdom . |

*Primary Examiner*—Steven L. Stephan
*Assistant Examiner*—Elvin G. Enad
*Attorney, Agent, or Firm*—Roger L. May; Mark S. Sparschu

[57] ABSTRACT

The present invention is a slip ring assembly for an automotive alternator, or other appropriate rotary electric machine, which includes at least one slip ring, a plastic body mounting the slip ring, at least one electrical terminal connected to the slip ring and supported by the body and at least one reinforcement ring. The reinforcement ring is operatively disposed on the plastic body and operatively adapted so as to strengthen the slip ring assembly against catastrophic failure resulting from loads applied to the slip ring assembly while it is under severe operating conditions. By employing such a reinforcement ring, the present slip ring assembly can be produced inexpensively with plastic bodies made from polyester and like plastics and yet still be able to withstand operating loads applied under high rotational speeds, elevated temperatures and other adverse conditions.

9 Claims, 2 Drawing Sheets

SLIP RING ASSEMBLY WITH REINFORCEMENT RING

FIELD OF THE INVENTION

The present invention ms related to slip ring assemblies mounted on the rotor of automotive alternators, and more particularly to an alternator slip ring assembly with a reinforcement ring.

BACKGROUND OF THE INVENTION

Slip ring assemblies are used in the automotive industry to transfer power from the brushes to the coil of an alternator. A typical slip ring assembly, like that disclosed in U.S. Pat. Nos. 5,327,037 and 4,535,264, includes a molded body made from electrically insulating plastic, one or more electrically conductive slip rings mounted around the outside of the body, and two electrical terminals embedded in the plastic body and electrically connected to the slip rings.

The assembly body is usually molded out of either a polyester or phenolic plastic. Slip ring assemblies with bodies made of polyester plastic often fail catastrophically because they are not strong enough to withstand the dynamic loading they receive while in use, especially at elevated temperatures and high rotational speeds. Slip ring assemblies with bodies made of phenolic plastic are typically strong enough to survive such adverse conditions. However, phenolic plastic bodies are more expensive to produce than polyester plastic bodies.

Accordingly, there is a need for an improved slip ring assembly that is relatively inexpensive to produce but still suitably resistant to catastrophic failure, while being subjected to applied loads under severe operating conditions, such as high rotational speeds, elevated temperatures and the like.

SUMMARY OF THE INVENTION

The present invention satisfies this need by providing a slip ring assembly for an automotive alternator, or other appropriate rotary electric machine, wherein the slip ring assembly includes at least one slip ring, a plastic body mounting the slip ring, at least one electrical terminal connected to the slip ring and supported by the body and at least one reinforcement ring. The reinforcement ring is operatively disposed on the plastic body and operatively adapted so as to strengthen the slip ring assembly against catastrophic failure resulting from loads applied to the slip ring assembly while it is under severe operating conditions. By employing such a reinforcement ring, the present slip ring assembly can be produced inexpensively with plastic bodies made from polyester and like plastics and yet still be able to withstand operating loads applied under high rotational speeds, elevated temperatures and other adverse operating conditions.

Slip ring assemblies typically include a plastic body having a tubular hub mounting the slip ring and a base mounting the terminal. It has been found desirable to embed the reinforcement ring around the base of the body. The terminals used in slip ring assemblies are often generally L-shaped with a foot section that is electrically attached to the slip ring. For any type of terminal with such a foot section, it has been found desirable to dispose the reinforcement ring to surround each foot section.

The reinforcement ring can be a closed ring which extends an entire 360°. Alternately, the reinforcement ring can be open or notched such that it extends less than 360°. It may be desirable to include hooks at the ends of open or notched reinforcement rings for retention in the slip ring assemblies.

The objectives, features, and other advantages of the present invention will become apparent upon consideration of the detailed description and the appended drawings.

DETAILED DESCRIPTION OF THE INVENTION

Although the present invention is herein described in terms of a specific embodiment, it will be readily apparent to those skilled in this art that various modifications, rearrangements, and substitutions can be made without departing from the spirit of the invention. The scope of the present invention is thus only limited by the claims appended hereto.

Figure 1:
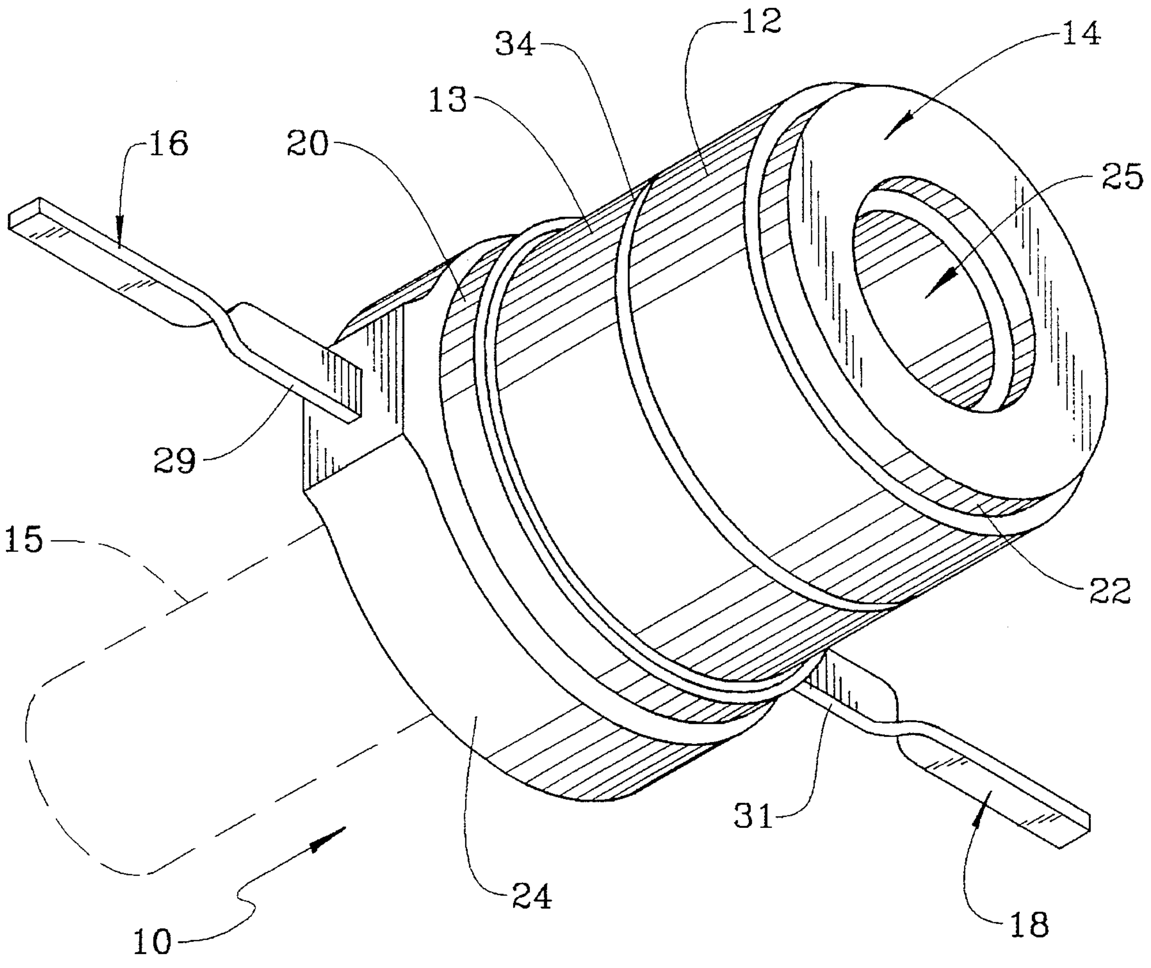
FIG. 1 is a perspective view of one embodiment of the present slip ring assembly.
Figure 3:
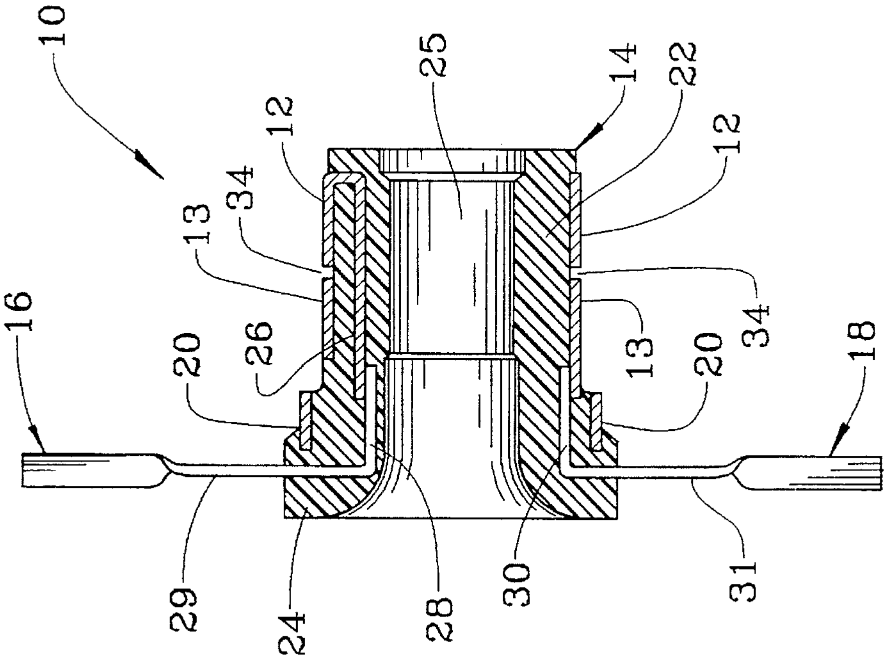
FIG. 3 is a cross sectional view taken along lines 3—3 in FIG. 2.
Figure 2:
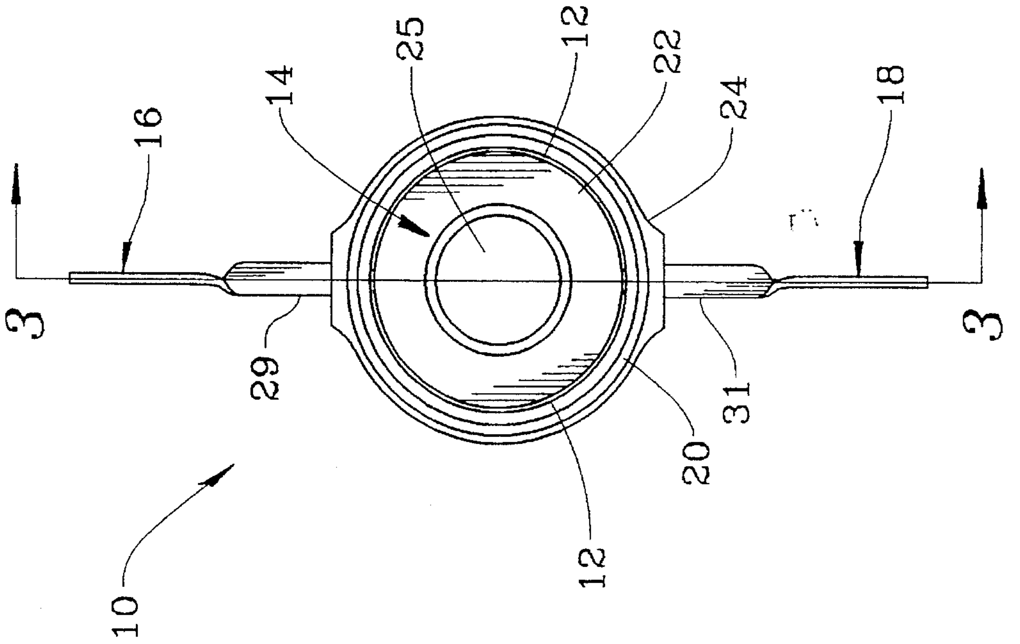
FIG. 2 is a front view of the embodiment of FIG. 1.

Referring to FIGS. 1–3, one embodiment of the present invention is a slip ring assembly 10 intended for mounting on a shaft 15 (shown in phantom) of a rotary electric machine, such as the rotor shaft of a motor vehicle alternator, like that disclosed in U.S. Pat. No. 5,327,037, which is incorporated herein by reference, in its entirety. Slip ring assembly 10 includes two slip rings 12 and 13, a plastic body 14 mounting the slip rings 12 and 13, and two electrically conductive terminals 16 and 18 which are embedded in the plastic body 14 and electrically connected to the slip rings 12 and 13, respectively. A reinforcement ring 20 is operatively disposed on the plastic body 14 and operatively adapted so as to strengthen the slip ring assembly 10 against catastrophic failure resulting from loads applied to the slip ring assembly 10 while it is being rotated by the rotor shaft 15.

The body 14 is preferably of molded plastic construction with a tubular hub section 22 at its leading end, a base section 24 at its rear end and a central bore 25 formed through the hub 22 and base 24. Suitable plastics for molding body 14 include glass filled thermoset polyester and polyphenylene sulfide. Those skilled in the art will appreciate that alternative materials may also be used to form the body 14 of slip ring assembly 10. The body 14 is operatively adapted for receiving the rotor shaft 15 through bore 25 so as to rotate with the rotor shaft 15 around its axis of rotation. Hub 22 serves to support and insulate slip rings 12 and 13 from each other and from the rotor shaft 15.

The slip rings 12 and 13 are usually made of copper. Slip ring 12 includes a tab 26 which is embedded into the plastic body 14 during the molding process. Each of the terminals 16 and 18 is typically made of a weldable steel of sufficient electrical conductivity. Each terminal 16 and 18 is generally L-shaped with a foot section 28 and 30 and a leg section 29 and 31, respectively. The foot sections 28 and 30 are molded in place into the base 24 of body 14. The foot section 28 is electrically attached to the slip ring 12, such as by soldering or welding to the tab 26. The foot section 30 is likewise electrically attached directly to the slip ring 13.

For any type of terminal with a foot section, it has been found desirable to space the reinforcement ring 20 away from the leg sections 29 and 31 so as to surround each of the foot sections 28 and 30, as shown in FIG. 3. The reinforcement ring 20 extends around the base 24 and is secured thereto, preferably, by being integrally molded or otherwise embedded partially or totally into the plastic body 14. The reinforcement ring 20 can be made of any suitable material of sufficient strength to provide the desired reinforcement, such as a metal or metal alloy (e.g., a 3003 aluminum alloy) or a composite material (e.g., a continuous filament wound glass fiber composite).

If made of an electrically conductive material, the reinforcement ring 20 should be embedded in body 14 so as to be electrically isolated, by a suitable barrier of insulating material, from the slip rings 12 and 13 as well as both terminals 16 and 18. An electrically conductive reinforcement ring 20 can be electrically isolated by positioning the reinforcement ring 20 so that the plastic of the body 14 forms the barrier. It may also be desirable to cover the reinforcement ring 20 with a separate insulating layer or coating (not shown) before being made a part of the assembly 10.

Figure 4:
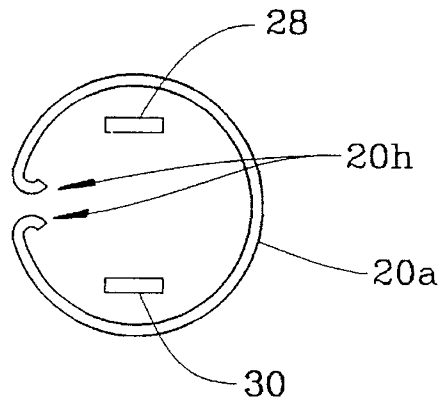
FIG. 4 is a front view of an open or notched reinforcement ring.

As shown in FIGS. 1–3, the reinforcement ring 20 is a closed ring which extends an entire 360° around the body 14. Alternately, a reinforcement ring **20*a* can be open or notched such that it extends less than 360° The reinforcement ring 20*a* is shown schematically in FIG. 4 as it preferably is positioned relative to the foot sections 28 and 30 of the terminals 16 and 18**, respectively.

If an open or notched reinforcement ring, such as the reinforcement ring **20*a*, is utilized, it must be made sufficiently rigid so as to provide the support necessary to properly reinforce the slip ring assembly 10. It may be desirable to include hooks 20*h* at the ends of the open or notched reinforcement ring 20*a* for retention of the reinforcement ring 20*a* in the body 14 of the slip ring assembly 10**. It should be understood that a variety of open and closed reinforcement rings can be used in the present invention and the term "reinforcement ring" is used in the claims to generally refer to all such reinforcement rings unless specifically defined therein.

Slip ring assembly 10 can be constructed by first soldering, welding or otherwise making an electrical connection between the terminal foot sections 28 and 30 and the corresponding slip rings 12 and 13. Once connected in this manner, the terminals 16 and 18 and the slip rings 12 and 13 are placed within an appropriately configured mold (not shown). The mold is filled with an appropriate plastic material to form body 14 in a conventional manner. For ease of manufacture, the slip rings 12 and 13 can begin as a single annular band or shell when inserted into the mold. Once the body 14 is formed and the molding process completed, the slip rings 12 and 13 are separated from one another by machining, cutting or otherwise forming a circumferential notch 34 in the annular band.

By employing a reinforcement ring, such as one of the reinforcement rings 20, **20*a*, the slip ring assembly 10** can be produced inexpensively with plastic bodies made from less expensive polyester and like plastics and yet still be able to withstand operating loads applied under high rotational speeds, elevated temperatures and other adverse operating conditions.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A slip ring assembly for a rotary electric machine, said slip ring assembly comprising:

a plastic body including a tubular hub and a base;

at least one slip ring mounted to said tubular hub of said plastic body;

at least one electrical terminal connected to said slip ring and supported by said base of said plastic body; and at least one reinforcement ring operatively disposed on said plastic body at least partially around said base and operatively adapted so as to strengthen said plastic body of said slip ring assembly against catastrophic failure resulting from loads applied to said slip ring assembly while in operation with a rotary electric machine.

2. The slip ring assembly of claim 1, wherein said reinforcement ring is embedded at least partially in said base.

3. The slip ring assembly of claim 1, wherein said reinforcement ring is integrally molded into said body.

4. The slip ring assembly of claim 1, wherein said terminal is L-shaped with a lower foot section embedded in said base, and said reinforcement ring is disposed around said base and said foot section.

5. The slip ring assembly of claim 1, wherein said reinforcement ring is made of aluminum.

6. The slip ring assembly of claim 1, wherein said reinforcement ring is made of a composite material.

7. A slip ring assembly for an alternator rotor assembly, said slip ring assembly comprising:

at least one electrically conductive slip ring;

an electrically insulating body including a tubular hub mounting said at least one slip ring and a base;

at least one electrically conductive terminal with a foot section embedded in said body and connected to said at least one slip ring; and at least one reinforcement ring operatively disposed at least partially around said base of said body and said foot section so as to strengthen said electrically insulating body of said slip ring assembly.

8. The slip ring assembly of claim 7, wherein said reinforcement ring is embedded at least partially in said body.

9. A slip ring assembly for an alternator rotor assembly, said slip ring assembly comprising:

at least one electrically conductive slip ring;

an electrically insulating plastic body having a hub mounting said slip ring and a base;

at least one L-shaped electrically conductive terminal with a foot section embedded in the base of said body and connected to said at least one slip ring; and a reinforcement ring embedded in the base of said body and around said foot section and operatively adapted for strengthening said electrically insulating body of said slip ring assembly against catastrophic failure resulting from stresses applied to said slip ring assembly while in operation with an alternator rotor assembly.

* * * * *